United States Patent
Betscher et al.

(10) Patent No.: US 10,464,426 B2
(45) Date of Patent: Nov. 5, 2019

(54) HIGH-VOLTAGE VEHICLE ELECTRICAL SYSTEM HAVING A PYROTECHNIC DISCONNECTING DEVICE, AND METHOD FOR OPERATING THE HIGH-VOLTAGE VEHICLE ELECTRICAL SYSTEM

(71) Applicant: Auto-Kabel Management GmbH, Hausen i.W. (DE)

(72) Inventors: Simon Betscher, Grevenbroich (DE); Wacim Tazarine, Erkelenz (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 16/070,729

(22) PCT Filed: Dec. 22, 2016

(86) PCT No.: PCT/EP2016/082309
§ 371 (c)(1),
(2) Date: Jul. 17, 2018

(87) PCT Pub. No.: WO2017/129334
PCT Pub. Date: Aug. 3, 2017

(65) Prior Publication Data
US 2019/0299787 A1 Oct. 3, 2019

(30) Foreign Application Priority Data
Jan. 25, 2016 (DE) .......................... 10 2016 101 252

(51) Int. Cl.
*B60L 3/04* (2006.01)
*B60R 21/017* (2006.01)
(Continued)

(52) U.S. Cl.
CPC ............ *B60L 3/04* (2013.01); *B60R 21/0176* (2013.01); *H01H 39/00* (2013.01); *H01H 89/00* (2013.01);
(Continued)

(58) Field of Classification Search
CPC .......... B60L 3/04; H01H 39/00; H01H 89/00; H01H 2039/008; H02H 7/10; B60R 21/0176
(Continued)

(56) References Cited

U.S. PATENT DOCUMENTS 8,355,233 B2  1/2013  Schumacher et al.

FOREIGN PATENT DOCUMENTS

DE  10 2009 020 559 A1  11/2009
DE  10 2010 041 018 A1  3/2012
(Continued)

OTHER PUBLICATIONS

DE 102013017409; Mario Friedrich; Oct. 19, 2013 (Year: 2013).*
(Continued)

*Primary Examiner* — Dharti H Patel
(74) *Attorney, Agent, or Firm* — Sunstein Kann Murphy & Timbers LLP

(57) ABSTRACT

High-voltage vehicle electrical system comprising a high-voltage battery terminal having a high-side terminal contact and a low-side terminal contact and a high-voltage output having a high-side output contact and a low-side output contact. For reliable isolation of a short-circuit current by using levitation, at least one series circuit arranged between the low-side terminal contact and the low-side output contact and consisting of a first switching relay and a pyrotechnic isolating device is provided.

10 Claims, 1 Drawing Sheet

(51) Int. Cl.
*H01H 89/00* (2006.01)
*H02H 7/10* (2006.01)
*H01H 39/00* (2006.01)

(52) U.S. Cl.
CPC ......... *H02H 7/10* (2013.01); *H01H 2039/008* (2013.01)

(58) Field of Classification Search
USPC .......................................................... 361/3
See application file for complete search history.

(56) References Cited

FOREIGN PATENT DOCUMENTS

| DE | 10 2011 014 343 A1 | 9/2012 |
|---|---|---|
| DE | 10 2011 103 834 A1 | 12/2012 |
| DE | 10 2013 017 409 A1 | 7/2014 |
| DE | 10 2013 019 259 A1 | 7/2014 |
| DE | 10 2015 006 206 A1 | 12/2015 |
| GB | 2489101 A | 9/2012 |
| WO | WO 2015/078049 A1 | 6/2015 |

OTHER PUBLICATIONS

German Patent and Trademark Office, Office Action—German Application No. 10 2016 101 252.1, dated Sep. 26, 2016, 6 pages (In German).

International Searching Authority, International Search Report—International Application No. PCT/EP2016/082309, dated Mar. 31, 2017, together with the Written Opinion of the International Searching Authority, 11 pages (In German).

International Preliminary Examining Authority, International Preliminary Report on Patentability—International Application No. PCT/EP2016/082309, dated Apr. 17, 2018, 12 pages (In German).

\* cited by examiner

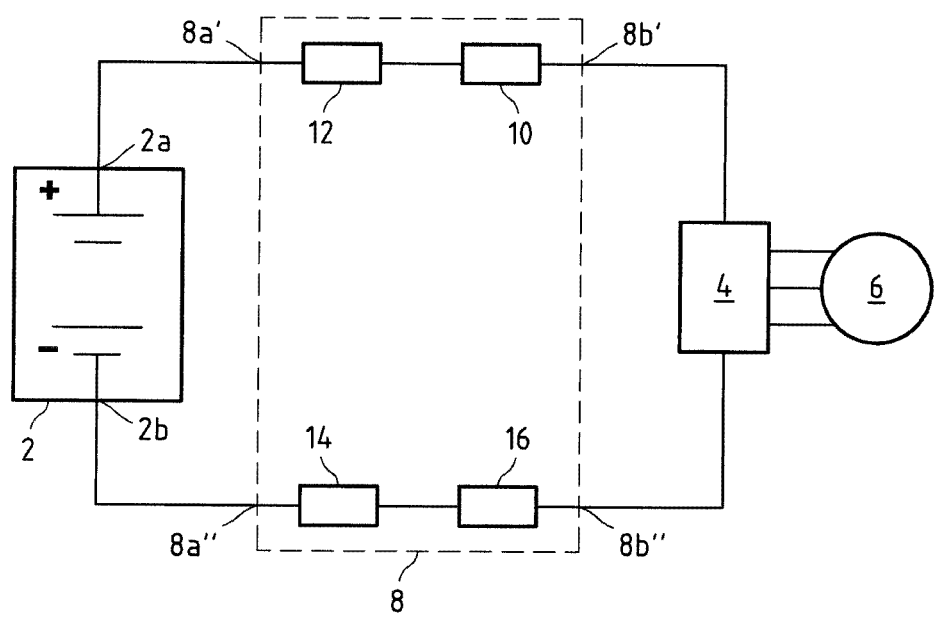

HIGH-VOLTAGE VEHICLE ELECTRICAL SYSTEM HAVING A PYROTECHNIC DISCONNECTING DEVICE, AND METHOD FOR OPERATING THE HIGH-VOLTAGE VEHICLE ELECTRICAL SYSTEM

CROSS-REFERENCE TO RELATED APPLICATIONS

This application is the national phase entry of international patent application no. PCT/EP2016/082309 filed Dec. 22, 2016 and claims the benefit of German patent application No. 10-2016-101-252.1, filed Jan. 25, 2016, the disclosures of which are incorporated herein by reference in their entirety.

TECHNICAL FIELD

The subject matter relates to a high-voltage vehicle electrical system, particularly in automotive applications, for example in hybrid electrical vehicles (HEVs), battery-electrical vehicles (BEVs) or fuel-cell vehicles (FCVs). The subject matter furthermore relates to a method for such a high-voltage vehicle electrical system.

BACKGROUND ART

The number of electrically operated vehicles will increase in the future. In this context, a stepwise transition from fossil fuels to electrical vehicle drives is to be observed. The application of the invention is, for example, expedient in hybrid electrical vehicles (HEVs), battery-electrical vehicles (BEVs) as well as in fuel-cell vehicles (FCVs).

Since in the next years and decades the number of electrically operated vehicles, particularly with electrical primary drives, will increase, the demands on the vehicle electrical systems are changing significantly. Crucial for the acceptance of electrical drives are in this case reliability as well as safety of the high-voltage vehicle electrical system.

Depending on the degree of electrification, i.e. what proportion of the drive power is electrical, the electrical power lies in the range of between 10 and 120 kW. Compared with conventional 12 V vehicle electrical systems, the operating voltage in the vehicle electrical systems of electrically operated vehicles is much higher. This is made possible by the integration of high-voltage batteries as chargeable energy storage units. Because of the much higher operating voltages, the complexity of the vehicle electrical system increases, and therefore so do the demands on the vehicle electrical components such as relays, lines and fuses.

Particularly at safety-critical times, reliable disconnection of the high-voltage vehicle electrical system from the high-voltage battery is a very essential point. For voltages of up to 1000 V DC and short-circuit currents in the kiloampere range, the demands on switching relays and fuses are considerable. Reliable switching behaviour of the relays as well as of the fuses must be ensured both in the normal situation and in the event of an accident. In the operating situation, switching is required at much lower currents than in the event of an accident or a fault. In the operating situation, i.e. for example during servicing and maintenance, although DC isolation must take place, the currents to be switched are however relatively low. Disconnection may be made possible by means of switching relays in the operating situation, or event in other special situations in which no short-circuit current flows, by means of switching relays.

In the event of a short circuit, however, much higher currents flow, and reliable disconnection must be possible even then. Conventionally, to this end a combination of fuses and relays is used both on the high side and on the low side. The fuses are used for disconnection in the event of a short circuit, whereas the relays are generally used for disconnection in the operating situation.

According to the subject matter, it has been found that the conventional combination of a fuse and a relay entails considerable outlay. The configuration of the respective combination of a fuse and relay must be mutually matched in order to ensure reliable tripping of the fuse even in the event of a short circuit. This leads to great demands on the tripping characteristics of relays and fuses, which leads to a considerable cost disadvantage.

It was therefore the object of the subject matter to provide a fuse for a high-voltage vehicle electrical system, which allows reliable short-circuit disconnection with low component costs.

SUMMARY OF THE INVENTION

A high-voltage vehicle electrical system according to the subject matter is generally arranged between a high-voltage battery and an electrical drive. In contrast to conventional 12 V vehicle electrical systems, in high-voltage vehicle electrical systems both the positive battery terminal (high side) and the negative battery terminal (low side) are connected by means of an electrical cable to the electric motor, preferably via a DC/DC or AC/DC converter arranged between them. The earth return therefore does not take place through the vehicle body. High-voltage batteries in the context of the subject matter are generally rechargeable energy storage units which provide output voltages of between a few hundreds of volts and a few thousands of volts. The output voltages are applied as direct voltages (DC) via the electrical lines of the high-voltage vehicle electrical system to the electrical drive motor. On the output side of the high-voltage vehicle electrical system, a DC/DC or AC/DC converter is generally also provided for converting the input voltage into a suitable output voltage for the electrical drive.

The electrical drives are operated with very high powers, which lie between 10 kW and more than 120 kW. Even with the high voltages mentioned, these high powers still entail very high currents.

During normal operation, such high currents are generally switched via a high-side relay. Such a high-side relay is located between the high-side terminal contact and the high-side output contact. On the low side, switching is generally carried out during operation only when the high-side relay has already been switched. For this reason, the low-side relay is generally configured for switching lower currents.

According to the invention, it has now been discovered that for emergency disconnection, for example in the event of a collision, the low-side relay must also be able to switch a high current. The Inventors have, however, discovered that a high current-switching capacity, such as is provided on the high side, is not necessary in order to ensure reliable switching. Rather, sufficient safety can be ensured between the low-side terminal contact and the low-side output contact with a series circuit according to the subject matter, consisting of a switching relay and a pyrotechnic isolating device.

In the event of an emergency, the first switching relay initially switches the short-circuit current at least partially.

Since very high currents occur, so-called levitation may take place. Levitation is also referred to as "electromagnetic repulsion". In this case, despite a coil being driven in the relay, a forced movement of the bridge contact takes place. The reason for this is the electromagnetic repulsion between two conductors through which a current flows in the opposite direction. In the case of the relay, the repulsion occurs because the fixed contact does not form full-surface contact with the bridge contact. This leads to the current flowing through the fixed contact to the point of contact with the bridge contact, and back from there. This leads to a current in the opposite direction. The non-orthogonal current directions resulting from this lead to repulsion between the bridge contact and the fixed contact. If levitation of the relay takes place, contact openings may occur, and arc discharges may be formed between the bridge contact and the fixed contact.

When the relay opens, an arc discharges formed in which the majority of the voltage drop already takes place. The effect of this is that the pyrotechnic isolator then only needs to switch a lower current. The Inventors have now discovered that levitation in the low-side relay may be made usable for the emergency disconnection. The levitation in the first switching relay already leads to a significant reduction of the switching voltage, or the switching current, in the pyrotechnic isolating device. This device can then switch the residual current without an arc discharge occurring, and isolate the high-voltage battery from the electric motor on the low side as well.

As already explained, the high-voltage vehicle electrical system also has a high-side fusing. This is achieved according to one embodiment by at least one second switching relay, which is arranged between the high-side terminal contact and the high-side output contact. Besides the second switching relay, a further fuse may also be provided on the high side.

As already explained, during normal operation, the current flows through the first and second switching relays. It is to be understood that the current also flows through the fuse, or the pyrotechnic isolating element. The current-carrying capacities, in particular the DC current-carrying capacities, of the two switching relays are therefore to be configured to be approximately equal. In particular, current-carrying capacities of more than 100 A, preferably more than 200 A, are necessary in order to carry the currents flowing in the switching relays during normal operation, without damaging them.

Furthermore, during normal operation the high-voltage battery is isolated from the electric motor by means of the high-side switching relay. Only after isolation of the high-side switching relay can the first switching relay on the low side also be opened. Since there is then already no current flowing, the first switching relay may be configured for a lower switching current than the first switching relay.

According to the invention, however, it has been discovered that, even then, emergency disconnection is possible on the high side as well as on the low side in the event of a short circuit. To this end, the levitation occurring in the first switching relay is made usable by the pyrotechnic isolator isolating at the time of the levitation in the first switching relay. Since the switching current in the pyrotechnic isolator is already reduced by the levitation occurring in the first switching relay, this pyrotechnic isolator may be configured for a low switching current.

The pyrotechnic isolator is advantageous compared with a conventional fuse, which is connected in series with a low-side switching relay, insofar as a fuse is self-tripping and requires a relatively large amount of electrical energy in order to trip. A fuse can generally trip rapidly only when all of the energy of the short circuit is actually available to the fuse. In the event of levitation, however, the battery voltage is shared between the fuse and the relay. When the relay opens by levitation, an arc discharge occurs in which the majority of the voltage drop already takes place. Then, however, only relatively little power is available to a conventional fuse, so that the fuse no longer trips rapidly enough. It may even occur that the fuse no longer trips at all, since the voltage drop occurring because of the levitation is already so great that the fuse can no longer trip.

The Inventors have, however, discovered that the levitation in the low-side switching relay, which is otherwise to be avoided, can be exploited by using the pyrotechnic isolator.

According to one embodiment, it is proposed for the pyrotechnic isolating device to be activated by an isolating signal. This externally introduced isolating signal may for example come from an airbag controller, which causes triggering of the airbag in the event of a collision. In such a case, it is also expedient to isolate the high-voltage battery from the vehicle electrical system. The trigger signal therefore leads to opening of the pyrotechnic isolator. Ignition of the pyrotechnic isolator may be carried out by any desired external isolating signal. For example, a current measurement may also be carried out in the vehicle electrical system, for example on the low side, and in the event of an overcurrent a trigger signal may be delivered to the pyrotechnic isolating device.

The pyrotechnic isolating device is generally distinguished in that a pyrotechnic isolating pellet can be activated by an electrical ignition pulse. The pyrotechnic reaction resulting from this leads to mechanical separation of an electrical connection at an isolating position.

According to one embodiment, the pyrotechnic isolating device is advantageously driven in such a way that it is activated in the event of levitation of the first switching relay. In the event of a short circuit, a high current flows through the low-side relay. There, levitation takes place and the bridge contact may be separated from the fixed contact. The residual current, which flows through the arc discharge, may however be isolated by means of the pyrotechnic isolating device without initiating a further arc discharge, so that the arc discharge occurring at the first switching relay collapses.

As already mentioned, the pyrotechnic isolating element is only meant to interrupt the residual current which occurs in the event of levitation. To this extent, the pyrotechnic isolating element is only configured for such a current as flows during levitation in the first switching relay. A conventional fuse cannot reliably isolate such a residual current, since the energy of the residual current is sometimes not sufficient to trip the fuse.

According to one embodiment, it is proposed for the pyrotechnic isolating device and the first switching relay to be installed in a common housing. In this way, it is possible for the safety-critical disconnecting mechanism for a short-circuit event in a high-voltage vehicle electrical system to be provided in a compact module.

In the event of a short circuit, it may occur that a short-circuit current flows between the output contacts. The first switching relay in this case opens at least partially because of the levitation. During this levitation, a residual current flows through the first switching relay, in particular along the arc discharge occurring there. The pyrotechnic isolating element is configured for isolation of this residual current.

According to a further aspect, the high-voltage vehicle electrical system is operated in such a way that, in an operating situation, a second switching relay between the high-side terminal contact and the high-side output contact is opened. That is to say, in the operating situation, switching can be carried out by means of the second switching relay since the switching currents are sufficiently small.

If the switching currents exceed several hundreds of amperes, however, for example in a fault situation, levitation may occur in the first switching relay between the low-side terminal contact and the output contact. The levitation at the first switching relay leads to partial opening of the first switching relay. According to the invention, the residual current flowing through the arc discharge formed by the levitation is isolated by the pyrotechnic isolating device.

BRIEF DESCRIPTION OF THE DRAWING

The subject matter will be explained in more detail below with the aid of a drawing which shows an embodiment. In the drawing:

FIG. 1 shows a schematic block diagram of a high-voltage vehicle electrical system according to the invention according to one exemplary embodiment.

DETAILED DESCRIPTION OF SPECIFIC EMBODIMENTS

FIG. 1 shows a high-voltage battery 2, having a positive terminal 2a on the high side and a negative terminal 2b on the low side. FIG. 1 furthermore shows a DC/DC converter 4, which is connected to an electrical drive motor 6. A high-voltage vehicle electrical system 8 is connected by means of a high-side terminal contact 8a' to the positive terminal 2a of the high-voltage battery 2. The high-voltage vehicle electrical system 8 is connected by means of a low-side terminal contact 8a" to the negative terminal 2b of the high-voltage battery 2. On the output side, the high-voltage vehicle electrical system 8 is connected on the high side by means of an output contact 8b', and on the low side by means of an output contact 8b", to the DC/DC converter 4. At least one switching relay 10 is arranged between the terminal contact 8a' and the output contact 8b'. A fuse 12 may furthermore be provided. A further relay and an ohmic resistance may be connected in parallel therewith (not shown). These may for example be used as current limiters when starting up, particularly in the case of a warm start. The starting current then flows first through the further relay and the resistor, and is thereby limited.

At least one pyrotechnic isolating element 14 and a switching relay 16, preferably assembled in a housing, are arranged between the terminal contact 8a" and the output contact 8b".

During operation, a current flows from the high-voltage battery 2 through the high-voltage vehicle electrical system 8 to the DC/DC converter 4. The operating currents flow both on the high side and on the low side.

The two switching relays 10 and 16 are configured in such a way that they can permanently carry the operating currents, which may even be 100 A or more, without their being damaged.

In normal disconnecting situations, i.e. during operation, it may be necessary to electrically isolate the high-voltage battery 2 from the DC/DC converter 4. To this end, the switching relay 10 is opened in order to interrupt the operating current. Since the operating current may be a few hundreds of amperes, the switching relay 10 is configured for switching such high currents. After the switching relay 10 has been opened, the switching relay 16 can be opened currentlessly, and DC isolation between the high-voltage battery 2 and the DC/DC converter can be ensured by the vehicle electrical system 8.

Should the switching relay 10 not actually isolate the disconnecting current, as a backup there is still the pyrotechnic isolating element 14 and a switching relay 16, and these can definitively disconnect the current.

In a fault situation, very high short-circuit currents, which are much higher than the operating currents, may briefly flow. In a fault situation, immediate isolation is necessary both on the high side and on the low side.

The Inventors have discovered that the levitation which may occur in the event of a short-circuit current through the switching relay 16 can be made usable. In particular, the Inventors have discovered that, in the event of a short-circuit current, a current much higher than the operating current flows through the switching relay 16.

At the switching relay 16, which is configured for lower switching currents than the switching relay 10, levitation takes place. That is to say, in spite of the activated coil of the switching relay 16, the bridge contact is lifted from the fixed contact. This takes place because of the electromagnetic repulsion of the current-carrying parts of the fixed contact, and respectively of the bridge contact.

By the levitation, which may also be referred to as electromagnetic repulsion, temporary isolation of the current path through the switching relay 16 takes place. Yet since the levitation causes only minor lifting of the bridge contact from the fixed contact in the switching relay 16, an arc discharge starts to burn between these two contacts, and a residual current flows through this arc discharge.

Since complete disconnection of the high-voltage battery 2 from the DC/DC converter 4 is necessary in a fault situation, according to the invention it is now proposed for the residual current occurring during the levitation to be isolated by means of the pyrotechnic isolating element 14. To this end, the pyrotechnic isolating element 14 receives an external control signal. By means of this external control signal, the pyrotechnic isolating element 14 is driven and the ignition pellet installed in it is ignited. The pyrotechnic reaction leads to mechanical separation of a conductor in the region of the pyrotechnic isolating element 14, so that an electrical connection between the terminal contact 8a" and the output contact 8b" is fully isolated.

Since the residual current to be isolated is much less than the short-circuit current, arc discharge formation no longer takes place in the region of the pyrotechnic isolating element 14. Rather, the current is completely isolated. Since the isolating element 14 only needs to be configured for isolation of the residual current, it may be significantly smaller and less high-powered than if it were formed for isolation of the short-circuit current.

The pyrotechnic isolating element 14 and the switching relay 16 may be installed together in a module with a housing. It is therefore particularly readily possible to replace this module after the event of a collision, in particular when it can for example be connected to the high-voltage vehicle electrical system 8 by means of plug contacts. Replacement is necessary anyway, since the pyrotechnic isolating element 14 has triggered. During this replacement, the switching relay 16 may also be replaced at the same time, this generally having been damaged significantly or destroyed by the arc discharge occurring during the levitation.

It is also possible to use the combination of a pyrotechnic isolating element 14 and a switching relay 16, optionally with different dimensioning of the switching relay 16, on the high side as well, i.e. as a replacement for the switching relay 10 and the fuse 12. A vehicle electrical system 8 may therefore also be envisaged in which a module, formed by the pyrotechnic isolating element 14 and a switching relay 10, 16, is provided both on the high side and on the low side.

Full galvanicisolation is achieved in that, according to the subject matter, a pyrotechnic isolating element isolates the residual current at least on the low side.

LIST OF REFERENCES

2 high-voltage battery
2*a* positive terminal
2*b* negative terminal
4 DC/DC converter
6 drive motor
8 high-voltage vehicle electrical system
8*a*', 8*a*" terminal contact
8*b*', 8*b*" output contact
10 switching relay
12 fuse
14 pyrotechnic isolating element
16 switching relay

What is claimed is:

1. High-voltage vehicle electrical system, comprising:
a high-voltage battery terminal having a high-side terminal contact and a low-side terminal contact;
a high-voltage output having a high-side output contact and a low-side output contact; and
at least one series circuit, arranged between the low-side terminal contact and the low-side output contact, having a first switching relay and a pyrotechnic isolating device, wherein the pyrotechnic isolating device is configured for flowing of a switching current during levitation in the first switching relay.

2. High-voltage vehicle electrical system according to claim 1, wherein at least one second switching relay is arranged between the high-side terminal contact and the high-side output contact.

3. High-voltage vehicle electrical system according to claim 2, wherein current-carrying capacities of the first and second switching relays are approximately equal, and wherein the current-carrying capacities of the first and second switching relays are more than 100 amperes.

4. High-voltage vehicle electrical system according to claim 2, wherein the first switching relay is configured for a lower switching current than the second switching relay.

5. High-voltage vehicle electrical system according to claim 4, wherein the pyrotechnic isolating device is activated by an airbag control signal.

6. Method for a high-voltage vehicle electrical system according to claim 2 comprising:
opening the at least one second switching relay between the high-side terminal contact and the high-side output contact;
levitating the first switching relay in response to a short circuit; so as to initially open the first switching relay between the low-side terminal contact and the low-side output contact; and
interrupting a residual current flowing through the arc discharge formed by the levitation by action of the pyrotechnic isolating device.

7. High-voltage vehicle electrical system according to claim 2 wherein current-carrying capacities of the first and second switching relays are approximately equal, and wherein the current-carrying capacities of the first and second switching relays are more than 200 amperes.

8. High-voltage vehicle electrical system according to claim 1, wherein the pyrotechnic isolating device is driven in such a way that it is activated in the event of levitation of the first switching relay.

9. High-voltage vehicle electrical system according to claim 1, wherein the pyrotechnic isolating device and the first switching relay are installed in a common housing.

10. High-voltage vehicle electrical system according to claim 1, wherein the first switching relay is only partially opened in the event of a short-circuit current flowing between the output contacts, a residual current then flowing through an arc discharge formed in the event of levitation of the first switching relay, and the pyrotechnic isolating device is configured for isolation of the residual current.

* * * * *